Figure 1:
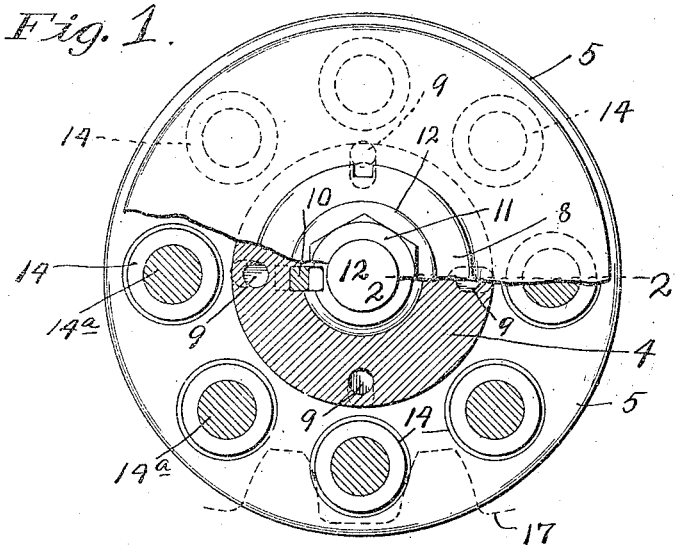

V. A. BOKER.
SELF LUBRICATING LANTERN GEAR.
APPLICATION FILED OCT. 23, 1916.

1,246,045.

Patented Nov. 13, 1917.

Witnesses
H. L. Opsahl.
E. C. Wells

Inventor
V. A. Boker.
By his Attorneys
Williamson & Merchant

UNITED STATES PATENT OFFICE.

VITUS A. BOKER, OF MINNEAPOLIS, MINNESOTA.

SELF-LUBRICATING LANTERN-GEAR.

1,246,045.    Specification of Letters Patent.    Patented Nov. 13, 1917.

Application filed October 23, 1916. Serial No. 127,130.

*To all whom it may concern:*

Be it known that I, VITUS A. BOKER, a citizen of the United States, residing at Minneapolis, in the county of Hennepin and State of Minnesota, have invented certain new and useful Improvements in Self-Lubricating Lantern-Gears; and I do hereby declare the following to be a full, clear, and exact description of the invention, such as will enable others skilled in the art to which it appertains to make and use the same.

My invention has for its object to provide a simple and highly efficient self-lubricating lantern gear or pinion, and to such ends, generally stated, the invention consists of the novel devices and combinations of devices hereinafter described and defined in the claims.

The improved lantern gear or pinion while capable of more general application, has been especially designed for use as a pinion coöperating with the so-called "bull pinion coöperating with the so-called "bull gear" of a traction wheel of a farm tractor. These "bull gears" and coöperating pinions must transmit a very great force, and as they are necessarily exposed to considerable dust and dirt, are subject to rapid wear. This rapid wear can be reduced very materially by proper lubrication, but lubrication has not hitherto been found an easy matter. Not only the rollers of the lantern gear or pinion should have their journals lubricated, but the faces thereof, and the coöperating tooth surfaces of the "bull gear" should also be lubricated. My improved pinion accomplishes all of these results and certain other important features which will hereinafter appear.

In the accompanying drawings which illustrate the invention, like characters indicate like parts throughout the several views.

Figure 2:
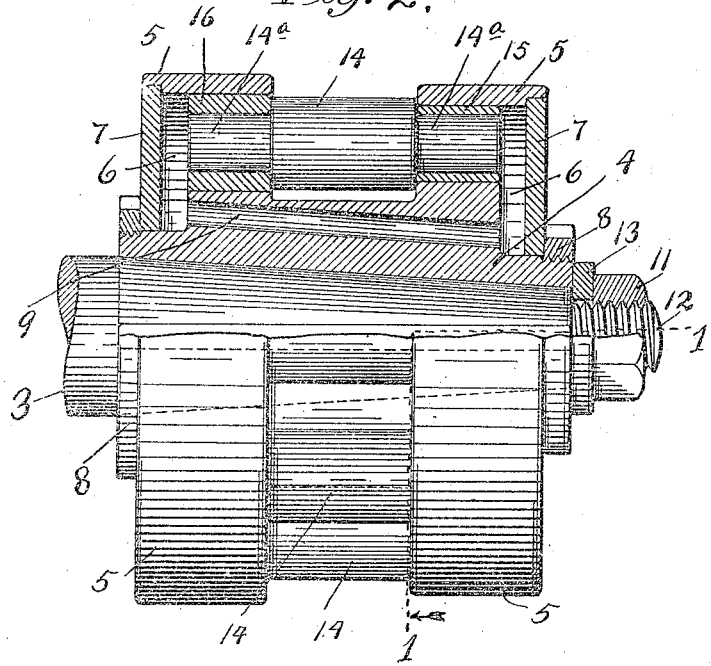

Referring to the drawings,

The improved lantern gear and axle on which it is secured is, in Figure 1, shown partly in side elevation and partly in vertical section on the irregular line 1—1 of Fig. 2; and Fig. 2 is a plan view of the parts shown in Fig. 1, with some parts sectioned on the line 2—2 thereof.

The axle 3, as shown, has a tapered end on which is rigidly secured the sleeve-like body 4 of the lantern gear. This gear body 4, preferably, is a casting and it is formed with heavy laterally spaced outstanding annular flanges 5 that are formed in their outer faces with annular oil chambers 6 that are normally closed by tightly fitting annular plates 7 held in position by annular nuts 8 having threaded engagement with the projecting ends of the sleeve-like body 4. The inner portions of the oil chambers 6 are connected by a multiplicity, as shown, four, oil ducts 9. These oil ducts 9, as shown, are located ninety degrees apart, and they converge toward the outer side of the gear.

The body sleeve 4, as shown, is held against rotation on the tapered end of the axle 9 by means of a key 10, and it is shown as further held against axial displacement by a nut 11 that engages the reduced threaded gudgeon 12 of the axle 9 and clamps a washer 13 directly against the outer end of the said body sleeve, and also against the shouldered end of the axle. The pins of this lantern gear are, as shown, in the form of rollers 14, the ends 14ᵃ of which are reduced in diameter and form the journals of the said rollers. These journals 14ᵃ rotate in bushings 15 and 16 that are tightly seated in axially alined seats formed in the flanges 5. The bushing 15 has an exterior diameter less than that of the body of the roller 14, but the exterior of the bushing 16 has an exterior diameter slightly greater than the body of the coöperating roller. This is important, because it permits the bodies of the rollers to be inserted axially through the seats in which the respective bushings 16 are seated.

For example, in assembling, the bushings 15 will first be pressed to position; then the rollers 14 will be inserted with their advance ends in the bushing 15; and then, the bushings 16 will be forced to position. This, of course, must be done while the left hand or inner plate 7 is removed from working position. The said bushings 15 and 16 should be so tightly forced into the seats that they will not rotate therein.

When both plates 7 are removed, driving force applied to the right hand or outer ends of the rollers, will force the same to the bushings 16 axially out of working position, so that with this gear it is an easy matter to replace both bushings and rollers.

A gear of this kind will usually be employed in connection with a "bull gear", such as that indicated, in part, by dotted lines in Fig. 1, and designated by the numeral 17. When thus used, this so-called lantern gear bears the relation thereto of a pinion, but it will, of course, be understood that a pinion may properly be designated as a small gear, for the purpose of definition.

The oil chambers 6 and ducts 9 will be filled with oil, preferably, a heavy lubricating oil, or semi-liquid grease, and this lubricant will work its way around the journals 14ª, thereby keeping the same lubricated, and will ooze out gradually onto the peripheral surface of the bodies of the rollers 14, thereby lubricating the working faces thereof and causing the same to carry the grease onto the coöperating working surfaces of the teeth of the gear 17. Thus, all of the friction engaging parts are kept lubricated.

It is highly important to note that there are two oil chambers, one at the inner and one at the outer extremities of the rollers and these two oil chambers are interconnected by one or more oil ducts or passages which permits oil to flow or to be forced from the one oil chamber into the other. This is believed to be a broadly new feature, regardless of the location or arrangement of the oil ducts which interconnect the said two oil chambers.

What I claim is:

1. A lantern gear comprising a body frame with laterally spaced flanges having oil chambers therein, and circumferentially spaced rollers having their ends journaled in said flanges and exposed to the said oil chambers, the said two oil chambers being interconnected for the flow of oil from the one chamber into the other.

2. A lantern gear comprising a body frame with latterly spaced outstanding flanges having annular oil chambers therein, and circumferentially spaced rollers journaled in said flanges with their ends exposed to the said two oil chambers, the said two oil chambers being interconnected for the flow of oil from the one chamber into the other.

3. A lantern gear comprising a body with laterally spaced outstanding flanges having annular oil chambers, and circumferentially spaced rollers having reduced ends journaled in said flanges and exposed to said oil chambers, the said body having an oil duct interconnected to said two oil chambers.

In testimony whereof I affix my signature in presence of two witnesses.

VITUS A. BOKER.

Witnesses:
F. D. MERCHANT,
HARRY D. KILGORE.

Copies of this patent may be obtained for five cents each, by addressing the "Commissioner of Patents, Washington, D. C."